US008910580B1

(12) United States Patent
Cockrell

(10) Patent No.: US 8,910,580 B1
(45) Date of Patent: Dec. 16, 2014

(54) WALL MOUNT CABINET ASSEMBLY

(71) Applicant: Stetforme Cockrell, Cocoa, FL (US)

(72) Inventor: Stetforme Cockrell, Cocoa, FL (US)

( * ) Notice: Subject to any disclaimer, the term of this patent is extended or adjusted under 35 U.S.C. 154(b) by 9 days.

(21) Appl. No.: 13/787,258

(22) Filed: Mar. 6, 2013

(51) Int. Cl.
*A47B 37/00* (2006.01)
*A47B 81/06* (2006.01)
*A47F 5/08* (2006.01)
*H05K 5/02* (2006.01)

(52) U.S. Cl.
CPC . *A47B 81/06* (2013.01); *A47F 5/08* (2013.01); *H05K 5/0247* (2013.01)
USPC .......................... 108/50.02; 108/152; 108/59

(58) Field of Classification Search
CPC ........ A47B 95/008; A47B 57/34; A47B 5/08; A47F 5/08
USPC .............. 108/42, 50.02, 92–93, 152, 193, 59, 108/50.01, 106–107, 109–110; 312/245, 312/223.6, 7.2; 211/90.04, 186, 189, 87.01, 211/90.01, 119.09
See application file for complete search history.

(56) References Cited

U.S. PATENT DOCUMENTS

| 2,213,115 | A | * | 8/1940 | Bales | 108/109 |
|---|---|---|---|---|---|
| 4,919,280 | A | * | 4/1990 | Phillips | 211/87.01 |
| 5,321,579 | A | * | 6/1994 | Brown et al. | 361/679.06 |
| 5,622,272 | A | * | 4/1997 | Orlando, Jr. | 211/90.01 |
| 5,769,516 | A | | 6/1998 | Aguilera | |
| 6,584,916 | B1 | * | 7/2003 | Felton et al. | 108/107 |
| 6,726,034 | B2 | * | 4/2004 | Holbrook et al. | 211/87.01 |
| D508,796 | S | | 8/2005 | Juneau | |
| 7,040,724 | B2 | | 5/2006 | Kelley et al. | |
| 7,261,213 | B2 | * | 8/2007 | Strating et al. | 211/87.01 |
| 7,275,648 | B2 | * | 10/2007 | Segovia, Jr. | 211/134 |
| 7,331,296 | B1 | * | 2/2008 | Wood | 108/42 |
| 7,384,107 | B2 | * | 6/2008 | Humberto | 312/245 |
| 7,404,609 | B2 | | 7/2008 | Nielsen | |
| 7,676,992 | B2 | * | 3/2010 | Burns | 52/36.6 |
| 7,832,570 | B1 | * | 11/2010 | Reynolds | 211/103 |
| 8,418,861 | B1 | * | 4/2013 | Weaver et al. | 211/90.02 |
| 8,517,189 | B2 | * | 8/2013 | Donohoe | 211/90.04 |
| 8,579,127 | B2 | * | 11/2013 | Dyck | 211/134 |
| 8,657,133 | B2 | * | 2/2014 | McGowan et al. | 211/189 |
| 2002/0084727 | A1 | | 7/2002 | Miller | |
| 2004/0055980 | A1 | * | 3/2004 | Krieger et al. | 211/86.01 |
| 2004/0135476 | A1 | | 7/2004 | Gillengerten | |
| 2005/0087661 | A1 | | 4/2005 | Rabenius | |
| 2006/0179458 | A1 | * | 8/2006 | Schmieder et al. | 725/78 |
| 2007/0044690 | A1 | * | 3/2007 | Lee | 108/50.02 |

(Continued)

FOREIGN PATENT DOCUMENTS

JP          2009002100 A    *   1/2009

*Primary Examiner* — Hanh V Tran

(57) ABSTRACT

A wall mount cabinet assembly safely mounts a flat screen television to a wall while also providing storage space for additional items. The assembly includes a frame having a first side positioned opposite a second side. A plurality of shelves is coupled to the frame and extends between the first side and the second side of the frame. A first side of each of the shelves extends outwardly of a front side of the frame. The plurality of shelves comprises at least two shelves wherein an uppermost one of the shelves is configured to support a flat-screen television positioned on the uppermost one of the shelves and a bottommost one of the shelves is configured to store items thereon. A plurality of mounting brackets is coupled to the frame and the shelves wherein the mounting brackets are configured for mounting the television to a wall surface.

11 Claims, 4 Drawing Sheets

(56) References Cited

U.S. PATENT DOCUMENTS

| | | | |
|---|---|---|---|
| 2008/0169734 A1 | 7/2008 | Bartels | |
| 2009/0039212 A1* | 2/2009 | Whalen et al. | 248/158 |
| 2009/0045706 A1* | 2/2009 | Levitt et al. | 312/223.3 |
| 2010/0060117 A1* | 3/2010 | Garg | 312/223.6 |
| 2011/0068071 A1* | 3/2011 | Suman et al. | 211/87.01 |
| 2011/0079685 A1* | 4/2011 | Kwak | 248/65 |
| 2011/0163050 A1* | 7/2011 | Grove | 211/26 |
| 2011/0198972 A1 | 8/2011 | Kirkeby et al. | |
| 2011/0219706 A1* | 9/2011 | Bates et al. | 52/36.1 |
| 2011/0233346 A1* | 9/2011 | Schluter | 248/65 |
| 2012/0206865 A1* | 8/2012 | Morris | 361/679.01 |
| 2012/0255919 A1* | 10/2012 | Jones et al. | 211/26 |

\* cited by examiner

WALL MOUNT CABINET ASSEMBLY

BACKGROUND OF THE DISCLOSURE

Field of the Disclosure

The disclosure relates to cabinet assemblies and more particularly pertains to a new cabinet assembly for safely mounting a flat screen television to a wall while also providing storage space for additional items.

SUMMARY OF THE DISCLOSURE

An embodiment of the disclosure meets the needs presented above by generally comprising a frame having a first side positioned opposite a second side. A plurality of shelves is coupled to the frame and extends between the first side and the second side of the frame. A first side of each of the shelves extends outwardly of a front side of the frame. The plurality of shelves comprises at least two shelves wherein an uppermost one of the shelves is configured to support a flat-screen television positioned on the uppermost one of the shelves and a bottommost one of the shelves is configured to store items thereon. A plurality of mounting brackets is coupled to the frame and the shelves wherein the mounting brackets are configured for mounting the television to a wall surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
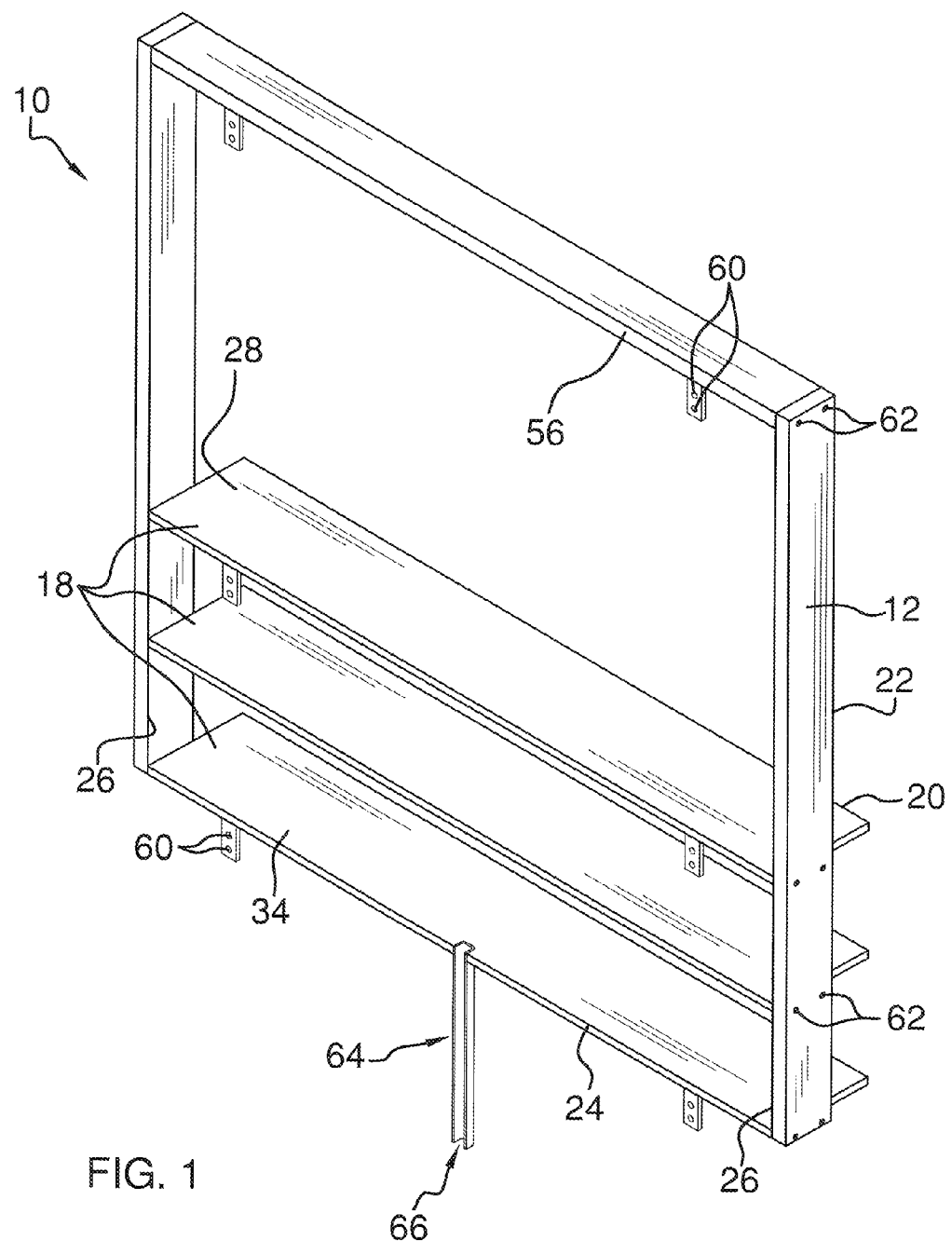
FIG. 1 is a top back side perspective view of a wall mount cabinet assembly according to an embodiment of the disclosure.
Figure 2:
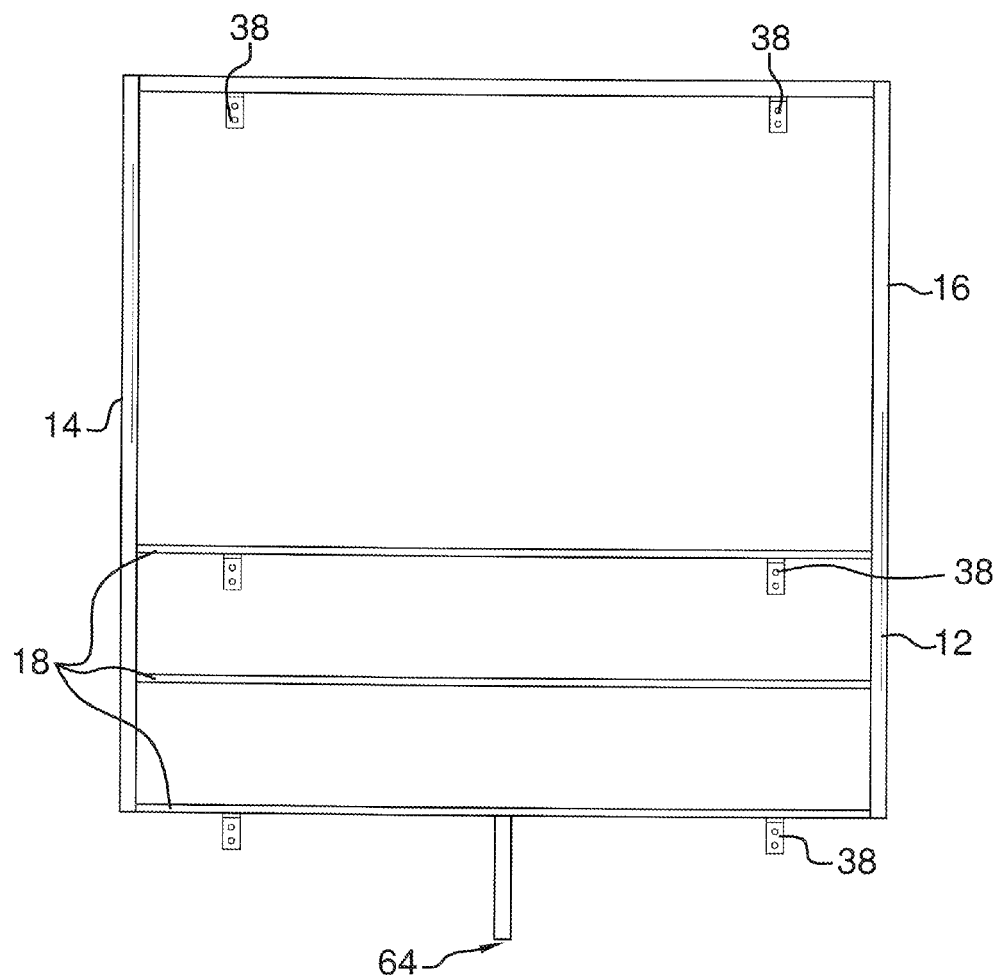
FIG. 2 is a front view of an embodiment of the disclosure.
Figure 4:
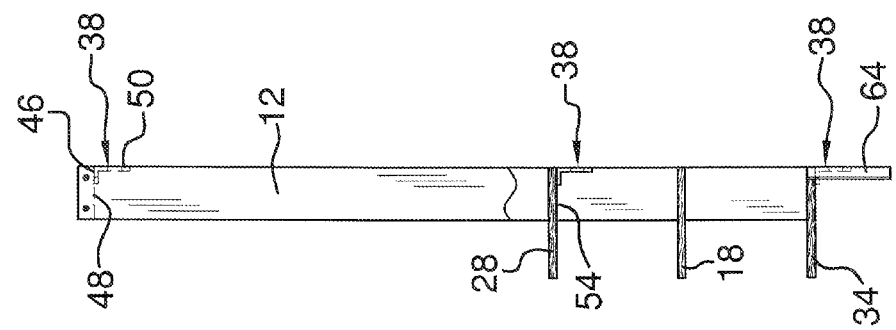
FIG. 4 is a cross-sectional view of an embodiment of the disclosure taken along line 4-4 of FIG. 3.
Figure 3:
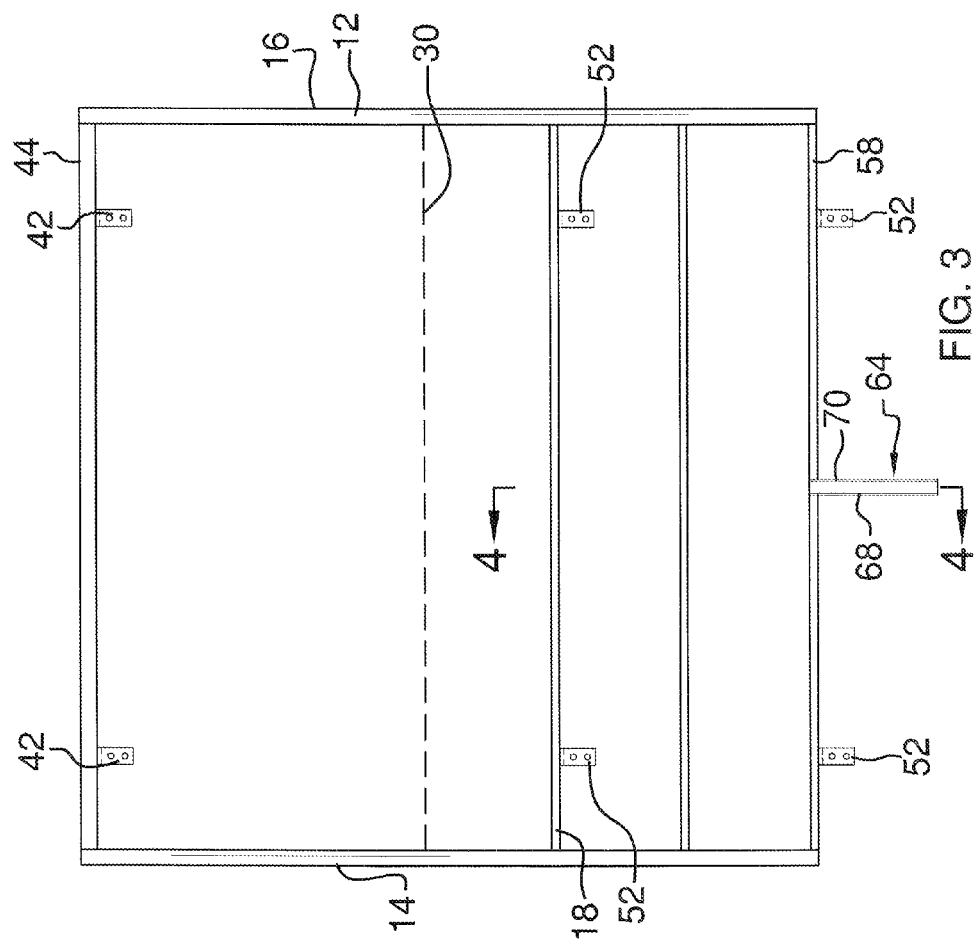
FIG. 3 is a back view of an embodiment of the disclosure.
Figure 5:
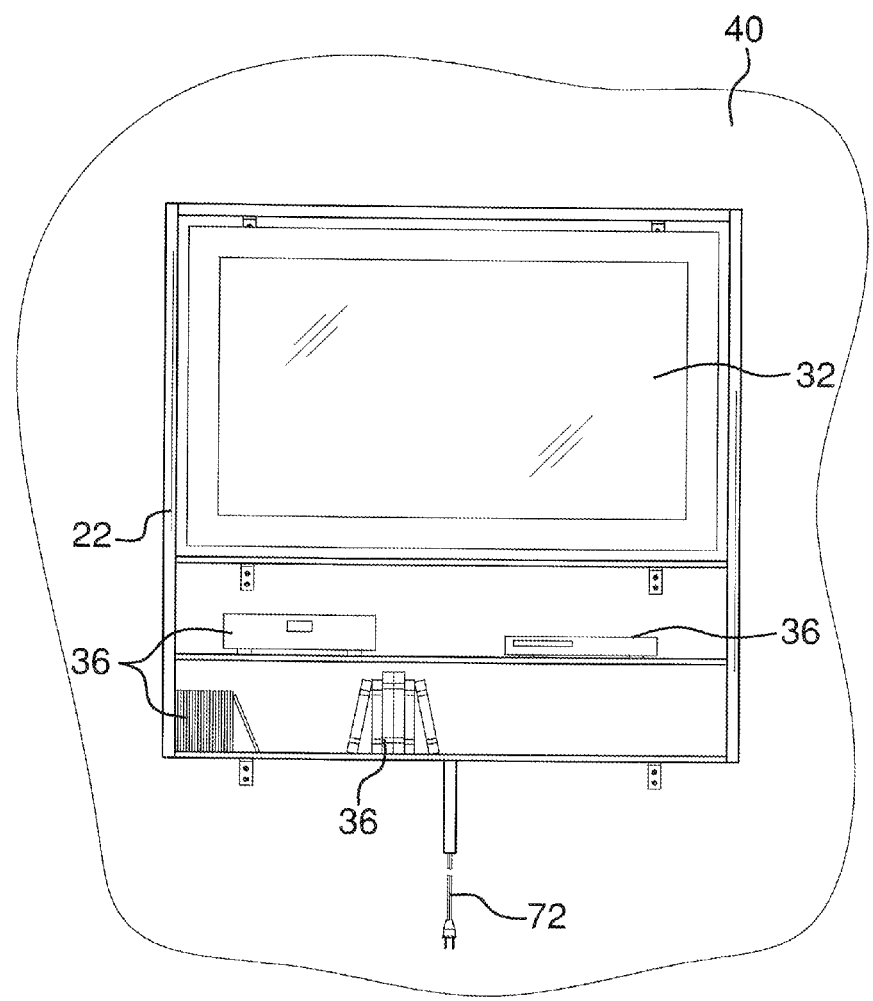
FIG. 5 is a front view of an embodiment of the disclosure in use.

With reference now to the drawings, and in particular to FIGS. 1 through 5 thereof a new cabinet assembly embodying the principles and concepts of an embodiment of the disclosure and generally designated by the reference numeral 10 will be described.

As best illustrated in FIGS. 1 through 5, the wall mount cabinet assembly 10 generally comprises a frame 12 having a first side 14 positioned opposite a second side 16. A plurality of shelves 18 is coupled to the frame 12. The shelves 18 extend between the first side 14 and the second side 16 of the frame 12. A first side 20 of each of the shelves 18 extends outwardly of a front side 22 of the frame 12. The shelves 18 are spaced and vertically aligned. Each of the shelves 18 has a first edge 24 aligned with a first edge 26 of each of the first and second sides 14, 16 of the frame 12. The plurality of shelves 18 comprise at least two shelves 18 wherein an uppermost 28 one of the shelves 18 is positioned below a center line 30 extending transversely from the first side 14 to the second side 16 of the frame 12 wherein the uppermost one 28 of the shelves 18 is configured to support a flat-screen television 32 positioned on the uppermost one 28 of the shelves 18 and a bottommost 34 one of the shelves 18 is configured to store items 36 thereon. Where there are more than two shelves 18, all of the shelves 18 except the uppermost one 28 of the shelves 18 is also capable of storing items 36 thereon. Such items 36 may include DVDs, games, cable boxes, DVD players, and the like. Where a larger television 32 is used, the shelves 18 are preferably thicker to withstand greater weight. The frame 12 and the shelves 18 are constructed from two-by-four lumber, such as plywood. The first side 14 and the second side 16 of the frame 12 each have a width between approximately 3 centimeters and 15 centimeters. The frame 12 is designed to provide a tight fit around the television 32 and can hold a television 32 measuring between 45 centimeters and 85 centimeters.

A plurality of spaced mounting brackets 38 is provided. The mounting brackets 38 are coupled to the frame 12 and the shelves 18 wherein the mounting brackets 38 are configured for mounting the television 32 to a wall surface 40. A first pair 42 of mounting brackets 38 is coupled to and extends downwardly from a top side 44 of the frame 12 wherein a first portion 46 of the mounting brackets 38 is abutted against a bottom surface 48 of the top side 44 of the frame 12 and a second portion 50 of the mounting brackets 38 is positioned perpendicular to the top side 44 of the frame 12. A second pair 52 of mounting brackets 38 is coupled to each of the uppermost and bottommost one 28, 34 of the shelves 18 wherein the first portion 46 of the mounting brackets 38 is abutted against a bottom surface 54 of the shelves 18 and the second portion 50 of the mounting brackets 38 is positioned perpendicular to the shelves 18. The first pair 42 of the mounting brackets 38 is coupled to a back side 56 of the top side 44 of the frame 12. The second pair 52 of the mounting brackets 38 is coupled to a back side 58 of an associated one of the shelves 18. The mounting brackets 38 have a plurality of holes 60 therein. The mounting brackets 38 are preferably L-shaped. A plurality of fasteners 62 couples the shelves 18 to the frame 12 and the top side 44 of the frame 12 to the first and second sides 14, 16 of the frame 12. For flat screen televisions 32 that are relatively heavy, or where the weight from the items 36 stored on the shelves 18 is relatively heavy, additional mounting brackets 38 may be required. The brackets 38 have a length and width between approximately 1 centimeter and 5 centimeters.

A wiring trough 64 is coupled to one of the shelves 18. The wiring trough 64 extends downwardly out of the back side 58 of the bottommost one 34 of the shelves 18. The wiring trough 64 is centrally positioned between the first side 14 and the second side 16 of the frame 12. A slot 66 extends between a first side 68 and a second side 70 of the wiring trough 64 wherein the slot 66 is configured to receive electrical cords 72 from the flat-screen television 32 and the items 36 stored on each of the shelves 18.

In use, as stated above and shown in the Figures, the flat-screen television 32 is mounted to a wall surface 40 using the mounting brackets 38. Two mounting brackets 38 are coupled to the top side 44 of the frame 12, two mounting brackets 38 are coupled to the uppermost one 28 of the shelves 18, and two mounting brackets 38 are coupled to the bottommost one 34 of the shelves 18. Items 36, such as games, DVD players, cable boxes, and the like are placed on the shelves 18 that are positioned below the uppermost one 28 of the shelves 18. The television 32 is placed and securely stored on the uppermost one 28 of the shelves 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements,

I claim:

1. A wall mount cabinet assembly comprising:
   a frame having a first side positioned opposite a second side;
   a plurality of shelves coupled to said frame, said shelves extending between said first side and said second side of said frame, a first side of each of said shelves extending outwardly of a front side of said frame, said plurality of shelves comprising at least two shelves wherein an uppermost one of said shelves is configured to be positioned below a wall mounted flat-screen television and a bottommost one of said shelves;
   a plurality of mounting brackets, said mounting brackets being coupled to said frame and said shelves wherein said mounting brackets are configured for mounting said frame and said shelves to a wall surface;
   a wiring trough coupled to said bottommost one of said shelves, said wiring trough extending downwardly out of a back side of said bottommost one of said shelves, said bottommost one of said shelves having a rear edge having a notch therein, said trough being positioned in said notch such that said trough is flush with said rear edge, said trough including a vertically oriented slot facing rearwardly of said shelves, said slot being configured to receive electrical cords from the flat-screen television and the items stored on each of said shelves.

2. The assembly of claim 1, wherein said shelves are spaced and vertically aligned with respect to each other.

3. The assembly of claim 1, wherein each of said shelves has a first edge aligned with a first edge of each of said first and second sides of said frame.

4. The assembly of claim 1, wherein said uppermost one of said shelves is positioned below a center line extending transversely from said first side to said second side of said frame.

5. The assembly of claim 1, wherein said mounting brackets are spaced.

6. The assembly of claim 1, wherein said mounting brackets further comprise:
   a first pair of mounting brackets being coupled to and extending downwardly from a top side of said frame wherein a first portion of said mounting brackets are abutted against a bottom surface of said top side of said frame and a second portion of said mounting brackets is positioned perpendicular to said top side of said frame; and
   a second pair of mounting brackets being coupled to each of said uppermost and bottommost one of said shelves wherein said first portion of said mounting brackets is abutted against a bottom surface of said shelves and said second portion of said mounting brackets is positioned perpendicular to said shelves.

7. The assembly of claim 6, wherein:
   said first pair of mounting brackets are coupled to a back side of said top side of said frame; and
   said second pair of mounting brackets are coupled to a back side of an associated one of said shelves.

8. The assembly of claim 1, wherein said mounting brackets have a plurality of holes therein.

9. The assembly of claim 1, wherein said mounting brackets are L-shaped.

10. The assembly of claim 1, further comprising a plurality of fasteners coupling said shelves to said frame and a top side of said frame to said first and second sides of said frame.

11. A wall mount cabinet assembly comprising:
    a frame having a first side positioned opposite a second side;
    a plurality of shelves coupled to said frame, said shelves extending between said first side and said second side of said frame, a first side of each of said shelves extending outwardly of a front side of said frame, said shelves being spaced and vertically aligned, each of said shelves having a first edge aligned with a first edge of each of said first and second sides of said frame, said plurality of shelves comprising at least two shelves wherein an uppermost one of said shelves is positioned below a center line extending transversely from said first side to said second side of said frame wherein said uppermost one of said shelves is configured to be positioned below a wall mounted flat-screen television and a bottommost one of said shelves;
    a plurality of spaced mounting brackets, said mounting brackets being coupled to said frame and said shelves wherein said mounting brackets are configured for mounting the said frame and said shelves to a wall surface, said mounting brackets having a plurality of holes therein, said mounting brackets being L-shaped, said mounting brackets further comprising:
    a first pair of mounting brackets being coupled to and extending downwardly from a top side of said frame wherein a first portion of said mounting brackets are abutted against a bottom surface of said top side of said frame and a second portion of said mounting brackets is positioned perpendicular to said top side of said frame, said first pair of said mounting brackets being coupled to a back side of said top side of said frame, and
    a second pair of mounting brackets being coupled to each of said uppermost and bottommost one of said shelves wherein said first portion of said mounting brackets is abutted against a bottom surface of said shelves and said second portion of said mounting brackets is positioned perpendicular to said shelves, said second pair of said mounting brackets being coupled to a back side of an associated one of said shelves;

a plurality of fasteners coupling said shelves to said frame and said top side of said frame to said first and second sides of said frame;

a wiring trough coupled to said bottommost one of said shelves, said wiring trough extending downwardly out of said back side of said bottommost one of said shelves, said bottommost one of said shelves having a rear edge having a notch therein, said trough being positioned in said notch such that said trough is flush with said rear edge, said wiring trough being centrally positioned between said first side and said second side of said frame; and a slot extending between a first side and a second side of said wiring trough wherein said slot is configured to receive electrical cords from the flat-screen television and the items stored on each of said shelves.

\* \* \* \* \*